Sept. 17, 1946.  B. N. ENGLE  2,407,821
INDENTING DEVICE
Filed June 13, 1944  2 Sheets-Sheet 1
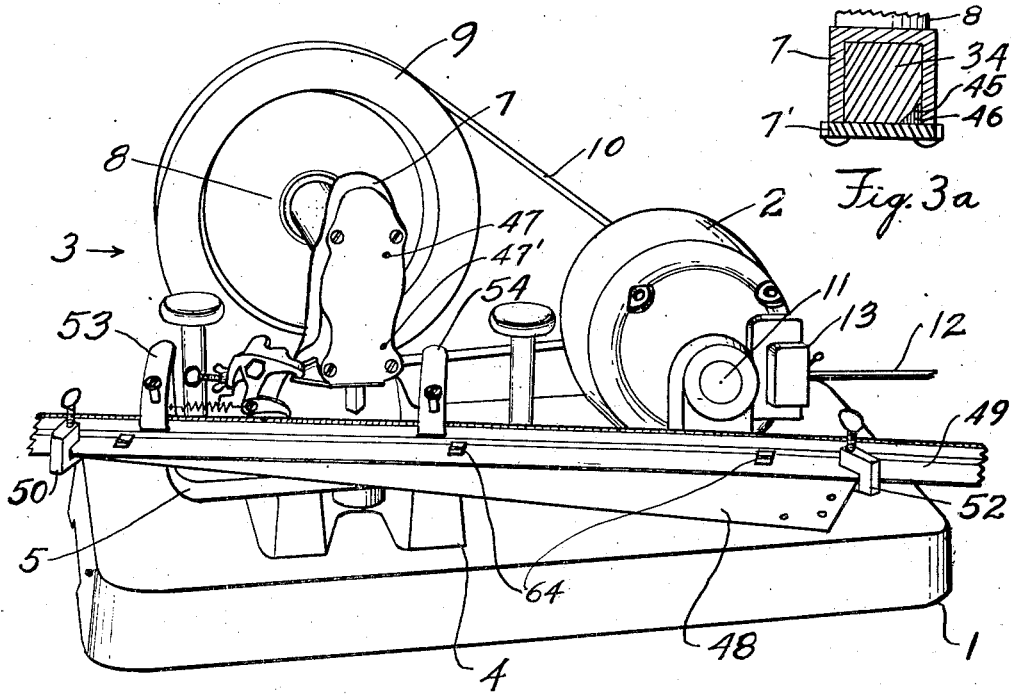
Fig. 1
Fig. 3a
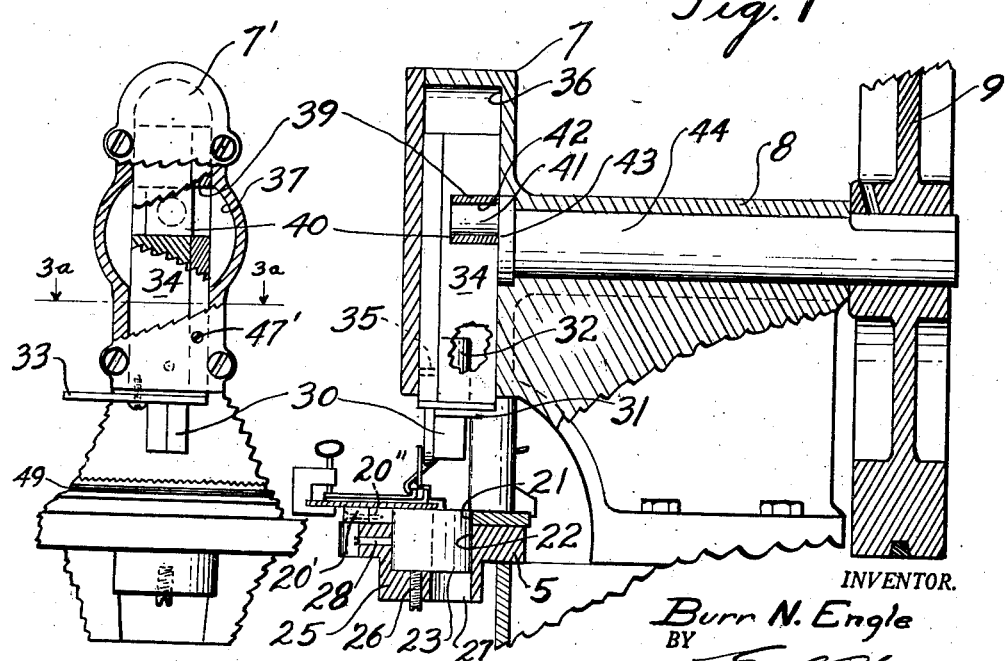
Fig. 3
Fig. 2
INVENTOR.
Burr N. Engle
BY
Earl E. Moore
ATTY.

Sept. 17, 1946.　　　　B. N. ENGLE　　　　2,407,821
INDENTING DEVICE
Filed June 13, 1944　　　　2 Sheets-Sheet 2

INVENTOR.
Burr N. Engle
BY
Earl E. Moore
ATTY.

Patented Sept. 17, 1946

2,407,821

UNITED STATES PATENT OFFICE 2,407,821

INDENTING DEVICE

Burr N. Engle, Los Angeles, Calif., assignor to Inga M. Engle, Los Angeles, Calif.

Application June 13, 1944, Serial No. 540,167

8 Claims. (Cl. 76—29)

This invention relates to devices and apparatuses for cutting teeth in various kinds and shapes of material such as bands, sheets, plates, etc. which require teeth or serrations of any kind or type. The invention is especially adapted for reteething old saws, racks and other notched items made of material wherein the teeth can be punched out; the kind of material to be toothed is of no moment, although the invention would be used mostly upon plastics and metals in which teeth are to be formed.

When old saws and the like are retoothed by the use of this invention, the retoothing operation automatically punches or forms the new teeth as it removes the old teeth, and to complete the job, setting and filing is all that is necessary in order to provide a perfect cutting saw.

To retooth any hand saw in accordance to this invention, the saw handle should first be removed. The blade of the saw is then secured to the under surface of a flanged saw carrier by means of pressure clamps. The flange of the carrier is then worked along a set of guides by a dog which forces the saw and its carrier to slide over a pivoted plate in intermittent predetermined distances as the new teeth are cut by a reciprocating angled cutter. Means are provided for fixing and maintaining the spacing of the teeth as the machine operates, and for removing the cuttings from the device as freed from the blade.

One of the principal objects of the invention is to present an automatic tooth cutting machine that is sturdy and simple in construction, economical to make and manufacture, and dependable for giving perfect results and long wear and service.

Another object of the invention is to provide a tooth cutting machine with a reciprocable cutting punch and fix die that is adjustable in a plurality of directions, one of the adjustment directions being especially arranged to allow a new alinement of the fixed die with the top pivoted plate of the machine after grinding and sharpening of the fixed die.

Still another object is to provide a saw carrier which is adjustable for straight and curved alinement of the new teeth along the working edge of the saw, coupled with means for adjusting the pitch of the opposed edges of the teeth of the saw so as to provide a wide range of teeth alinement and tooth pitches.

And a still further object is to provide adjustable means for wedge-fitting the cutting plunger in its guide so as to assure an even and perfectly alined plunger and cutter.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

In the drawings:

Fig. 1 shows a machine designed in accordance to the invention, the same being in front perspective view, and end portions thereof being broken away.

Fig. 2 is a vertical cross sectional view of a principal portion of the machine.

Fig. 3 is a front elevational view of a portion of the machine with parts broken away to show some details.

Fig. 3a is a cross section taken substantially along the line 3a—3a of Fig. 3.

Figure 4:
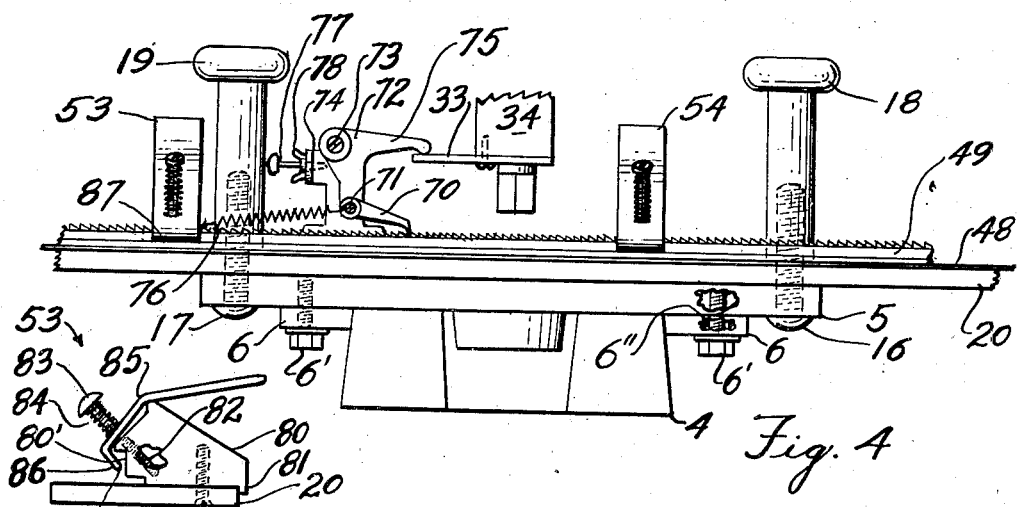
Fig. 4 is a front elevational view of a portion of the machine with parts broken away, but showing the principal working parts assembled with a saw to be toothed.

The entire tooth cutting device or machine is mounted upon a hollow flanged supporting table 1 which table has fixed to the top thereof, as by bolts or any other suitable means, an electric motor 2 and the cutting machine indicated in general by the numeral 3. The machine has a flanged hollow supporting base unit 4 which supports a working bed plate 5 in fixed relation thereto through the medium of the lugs 6 and the fastening bolts 6' on either side thereof. Note Fig. 4. The unit 4 also supports the plunger housing 7, which is integral with the shaft housing 8 extending therefrom, as shown. A cover 7' closes the chamber within the housing.

Mounted upon and keyed to a shaft is a flywheel type pulley wheel 9 having about its perimeter the usual groove to accommodate the endless pulley belt 10 which is connected to a pulley wheel, not shown, on the rear end of the motor shaft 11. The insulated cable 12 provides the motor with suitable electric current at the required voltage through the toggle type control switch 13.

At each end of the working bed plate 5 there is a curved slot indicated at 14 and 15, positioned as shown, through which pass their respective bolts 16 and 17. These bolts are adapted to threadedly engage the threaded bores of the shanks of the turn knobs 18 and 19, the knobs being designed to hold down a pivoted plate 20 in a predetermined fixed position when same are screwed against the top surface of the plate 20. At about the center of the plate 20 is an aperture 21. The plate 5 has an aperture 22 of the same size as 21 and similarly situated, both of these apertures accommodating a cylindrical female die element 23 having the V-cut 24 therethrough, note Figs. 2 and 5. The bottom of the die element 23 sits in an annular recessed portion of a depending boss 25 which is integral with the plate 5, this boss having a set screw 26 threaded therein, the top end of which engages the bottom of the die element so that the element may be raised a trifle after each grinding thereof and thus maintain a perfect level between the top of the element and the top of the pivot plate 20. In order to dispose of the cuttings and keep the top of plate 20 clean and unobstructed, a hole 27 is provided through the boss which allows the cuttings to drop onto the top of the table 1. The apertures 21 and 22 are a little oversize so that the die element can be shifted a trifle. A set screw 28 threaded in the plate 5 is provided to fix and hold the die element in position. For final adjustment and alinement of the female die with the male die, the holes 6" are made oversize so that the plate 5 can be shifted a little in any direction before the bolts 6' are tightened.

Above the V-cut of the female die element is the male die element or die plunger 30 integral with a circular stop flange 31 and the cylindrical shank 32; the shank passing through a lever plate 33 and snugly into a bore at the lower portion of a reciprocatory ram or slide block 34 which is a portion of a scotch yoke about to be described, the male die, however, being held in position by a set screw 35.

The ram 34 is positioned in the carefully machined guide chamber 36 having at its middle portion a circular shaped chamber 37. A removable cover 7' is provided at the front side of the chambers 36 and 37 and acts as a side of the guide for the ram. At the upper rear portion of the slide block there is a rectangular slot or cross cut 39 arranged to receive a rectangular and reciprocatory slip element or block 40 which is free to ride along the cross cut 39.

A crank pin 41 snugly fits a bore 42 in the slip element and has one end thereof integral with and at the edge of a circular crank arm 43 which is integral with one end of the power shaft 44. According to the aforesaid construction, the slide block and its male die element 30 will reciprocate vertically as the slip element 40 is rotated by the power shaft. Note that the male die will reciprocate vertically regardless of the direction of rotation of the power shaft.

In order to provide a dependable adjustment for the slide block 34 within its guide chamber 36, one corner of the block is cut away to make the bevelled surface 45 along its entire length. An adjusting strip 46 is provided that has a cross section of a right triangle, the hypothenuse surface of which is abutted to the bevelled surface 45 of the block to provide a gib or wedge-like adjusting strip. Spaced along the cover 7' of the housing are a pair of adjusting screws 47 and 47' which are threaded to their respective bores in the cover, and the ends of which are adapted to press against the front surface of the adjusting strip when the screws are turned inwardly. By tightening the strip 46 against the block, the block is forced into snug engagement with at least two walls of the guide chamber, and this is for the purpose of avoiding any loose play of the block within its chamber and thus maintains the male die element 30 in perfect alinement with the female die so as to cut true on each stroke.

Figures 6, 7:
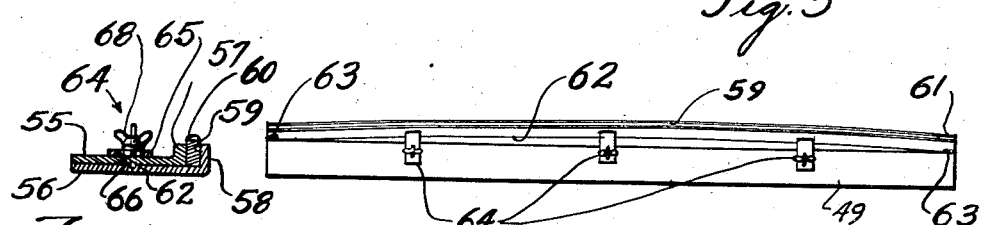
Fig. 6 is a plan view of the saw carrier and shown on a smaller scale, the rack thereof being removed.
Fig. 7 is a vertical cross section of the carrier of Fig. 6.

A saw 48, in which the new teeth are to be cut, is shown positioned upon the plate 20 and held thereon by the spacer carrier means 49, C-clamps 50 and 52, and the guide clamps 53 and 54. The carrier means is best shown in Figs. 6 and 7 and consists of upper and lower plates 55 and 56 respectively, each having the integral upstanding flanges 57 and 58 respectively, which upstanding flanges form a groove 59 adapted to snugly receive the rack, notched spacer bar, or track 60. At one end of the groove is a stop element 61 which prevents the rack being forced along the groove when pressure is applied thereto, that is, the pressure for shifting the carrier a predetermined distance for the next tooth cut. The upper and lower plates 55 and 56 have the longitudinal slits 62 with the ends of the slits reenforced with welds 63 to prevent rupture at these points when the slit is opened and closed a number of times. The purpose of the slit is to give the rack or track 60 a predetermined curve when it is desired to cut teeth in the saw blade along a slight arc thereof, a feature very desirable on carpenter hand saws to aid its cutting action on the harder woods. In order to hold the slit open, a plurality of clamps 64 are employed. Each of the clamps consists of a metal strip having its rear edge 65 welded to the top surface of the carrier plate 55, and a slot 66 through which passes a threaded stem 67 having its bottom end welded or otherwise fixed in bores of the plates 55 and 56. A wing nut 68 is used to hold the plate and the front of the clamp firmly together when the slit has been opened the degree desired to hold a fixed arc in the rack.

When narrow saws or bands are toothed, the front edge of the plate 20 is in the way of the C-clamps 50 and 52. To obviate this difficulty, the front edge of this plate is made removable. The removable section is shown at 20' in Fig. 2. Screws 20'' are employed to hold the section in place when needed.

The rack or track 60 is removable as it is held in the groove only by a friction fit. A plurality of such racks are provided having differently spaced teeth or notches along the top thereof, the spacing of the teeth in the various racks being predetermined to satisfy the requirements of the tooth spacings desired in the band, plate or saw being toothed. A dog 70 is loosely pivoted at 71 to the lower end of a bell crank 72 which is pivoted at 73 to a standard 74. The upper arm 75 of the bell crank has its free end in contact with the top of the lever plate 33 and is kept in contact therewith by the pull action of the tension spring 76, which spring has one end fixed to the screw at the pivot 71 and the other end fixed to a hook which is attached to a portion of the compression clamp 53. A lug extends from the standard and supports a set screw 77 having the winged lock-nut 78. The purpose of this screw is to provide an adjustable stop for the bell crank so that the dog can be adjusted to fall back either one or two or more notches or teeth on the rack rod 60. Obviously, when larger teeth are cut, the dog should be adjusted, by the screw 77, to cause greater advancement of the saw carrier 49 when the lever plate 33 is lifted.

The pressure clamps 53 and 54 each consist of a triangular-like body 80 which is bored and tapped to receive a screw for mounting of same upon the plate 20, the small lip 81 at the rear preventing turning of the clamp. A stepped portion 80' at the front of the clamp provides necessary recesses for the carrier and plate when the same are abutted against the clamp. The body has the bore 82 which is tapped and receives the lower portion of a spring tension adjusting screw 83 about which is coiled a compression spring 84. Mounted upon the front inclined surface of the clamp is a sturdy band spring 85, shaped as shown, having the front end flange 86, the end of this flange, at 87, being carefully rounded so that it will smoothly slide along the top of the carrier plate 55 just forward of the flange 57 thereof. When the flanges 57 and 58 are placed between the clamp body 80 and the end 87 of the band spring, the carrier of the saw is guided along a predetermined straight or curved line at any angle to which the plate 20 has been set.

Figures 5, 8:
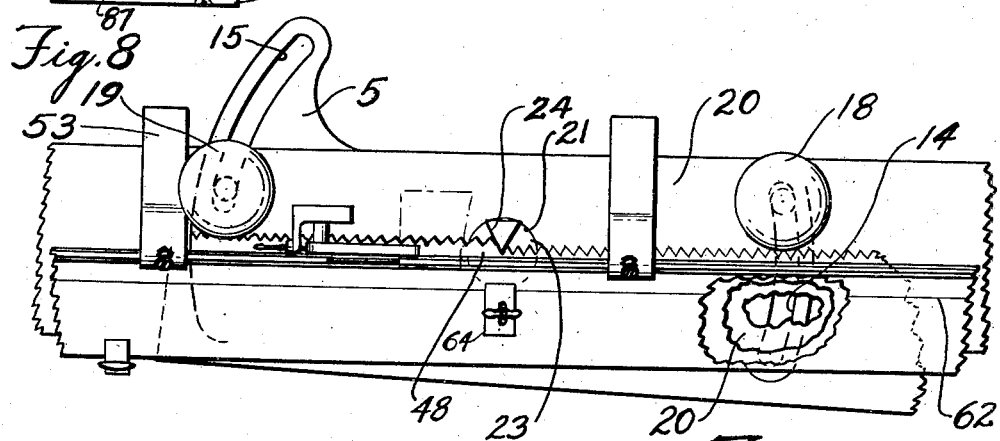
Fig. 5 is a plan view of Fig. 4.
Fig. 8 is a side elevational view of one of the guides.
Figure 9:
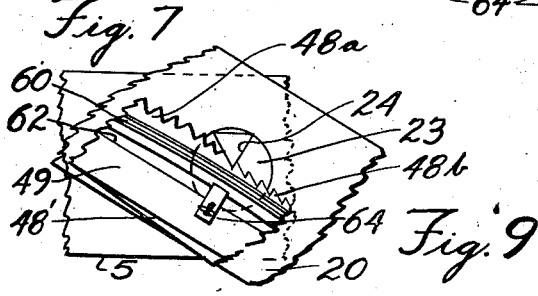
Fig. 9 is a fractional part of the machine shown in plan view with a different setting of the movable parts.

As clearly shown in Fig. 9 of the drawings, the saw carrier is illustrated to show it as set at a rather sharp angle with respect to the plate 5 which makes the new teeth 48b shaped for a rip saw rather than for a cross cut saw as shown in Fig. 5. The old teeth of the saw are indicated at 48a so that the reader can get a pretty good idea regarding the relative positions of the various plates and the carrier. Note that the slit, Fig. 9, is well opened so that the track 60 is in the form of a great arc, thus the new teeth are formed along the great arc. Instead of the saw 48' having a straight line of teeth as in the saw 48, the teeth of saw 48' will be along a line having a slight curve, the degree of the curve depending upon the width of the slit 62.

*General operation*

The general operation of the invention, as illustrated, concerns the retoothing of a carpenter's hand saw. The handle should first be removed and the blade secured under the carrier by means of the two C-clamps 50 and 52. These clamps have a spring tension of about 20 pounds each and they hold the saw blade flat onto the pivot plate 20 and also hold the saw carrier against the guide blocks 80. Proper tension for feeding the saw blade beneath the cutter 30 and positive alinement during the cutting or punching operation is thus obtained.

The V-shaped female die is stationary, while the triangular shaped punch reciprocates rapidly under power from the electric motor 2 via the connections of the scotch yoke, shaft, flywheel type pulley, and the endless pulley belt. The pawl or dog mechanism 70—75 advances the rack, or toothed index bar 60, one tooth on each press cycle. The number of teeth per inch on this index bar determines the number of points on the saw blade 48. By using various index bars, provided as standard equipment, any tooth size from 4 to 11 points, or better, can be cut.

By loosening the two hand wheels or knobs 18 and 19, the pivoted plate 20 may be swung in a horizontal plane around the female die 23 so that it can be set easily and quickly to establish the correct angle to produce the desired cross-cut or rip-cut teeth. As the pivot plate cannot get out of line, it is not necessary to change the saw blade setting on the carrier when once fixed or make any other adjustment thereof.

New teeth are punched one at a time in rapid succession as the blade is advanced under the guidance of the band spring ends 87 by the action of the dog 70, the dog making one stroke forward for each upward stroke of the male die 30. At each downward stroke of the male cutter, a new cut is made in the blade and the punched out portion of the blade is completely freed of the female die as all the punchings pass on down through the female die, through the hole 27 and onto the table top 1.

The foregoing operation makes completely new teeth arranged in a straight line. If it is desired to punch the teeth along a curved line, the winged nuts 68 are loosened on the clamps 64 and the slit 62 widened to the desired degree of curvature wanted upon the cutting edge of the saw blade, and then these clamps are tightened to maintain the curvature until the cutting is finished; otherwise, the settings are the same as mentioned above for the straight line cuttings.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a notching device for bands, blades, plates, etc., a supporting means having male and female die elements attached thereto and arranged to contact one another, power means connected with one of the elements for moving it into and out of contact with the other element, a bed plate, a carrier for holding and moving the thing to be notched, plate means supported by the bed plate and having a snug fitting bearing means with one of the die elements so as to be set in any one of a plurality of angular positions with respect to the other die element, guide means fixed to the plate means and in contact with the carrier to direct it along a definite path across a portion of one of the elements, operating means for automatically moving the carrier a predetermined distance at each stroke of the moving element, and clamping means for holding the thing to be notched on the carrier for movement therewith as each notch is cut.

2. In a notching device for bands, blades, plates, etc., as set forth in claim 1 wherein the fixed die has material depth for frequent grinding, under support means extending from the bed plate and beneath the said other element, micro-adjustable means connected to the under support means for bringing the ground surface of the said other die in substantial alinement with the top surface of the plate means, and means through the bed plate to pass chipped pieces and prevent clogging of either die element.

3. In a notching device for bands, blades, plates, etc., as set forth in claim 1 wherein the moving die element is attached to a reciprocating block having a rectangular cross section less a longitudinal corner portion thereof, a housing around the block to form a guide for the block, a wedging strip along the longitudinal corner portion of the block, and micro-adjusting means extending through the housing and in contact with the strip for urging the strip against the block so that it will snugly abut a portion of the guide.

4. In a notching device for bands, blades, plates, etc., a supporting means having male and female die elements attached thereto and arranged to contact one another, power means connected with one of the elements for moving it into and out of contact with the other element, a bed plate, a carrier for holding and moving the thing to be notched, plate means supported by the bed plate and arranged thereon to be set in any one of a plurality of angular positions with respect to one of the elements, guide means fixed to the plate means and in contact with the carrier to direct it along a definite path across a portion of one of the elements, operating means for moving the carrier a predetermined distance at each stroke of the moving element, and clamping means for holding the thing to be notched on the carrier for movement therewith as each notch is cut, said plate means having a narrow configuration, a strip removably attached to one of the longitudinal edges of the plate means for increasing its width to present a wide surface to accommodate wide bands, plates and blades to be toothed.

5. In a notching device for bands, blades, plates, etc., a supporting means having male and female die elements attached thereto and arranged to contact one another, power means connected with one of the elements for moving it into and out of contact with the other element, a bed plate, a carrier for holding and moving the thing to be notched, plate means supported by the bed plate and arranged thereon to be set in any one of a plurality of angular positions with respect to one of the elements, guide means fixed to the plate means and in contact with the carrier to direct it along a definite path across a portion of one of the elements, operating means for moving the carrier a predetermined distance at each stroke of the moving element, and clamping means for holding the thing to be notched on the carrier for movement therewith as each notch is cut, said carrier comprising an elongated plate having a slit lengthwise thereof, adjustable means to hold the slit open and cause one of the longitudinal edges of the carrier to form an arc so that the thing to be notched is notched along a curved line.

6. In an indenting device for plates and the like, a yoke supporting a male and a female die in combination with means for moving one of the dies into cutting relation with the other, table means for holding the work piece in position with respect to the dies, feeding means for moving the work along a definite path with respect to the dies, one of the dies consisting of an element having a plurality of cutting edges so that said one of the dies can be repositioned and bring a new sharp cutting edge into working position, said feeding means comprising an elongated L-shaped plate, guiding means for allowing the L-shaped plate to slip along the top of the table means, said plate having an elongated slit substantially the length thereof, adjustable holding means for maintaining the slit at various widths so as to give one edge of the L-shaped plate an arc shape.

7. In a notching device for bands and the like, a supporting means having male and female die elements attached thereto and arranged to contact one another, power means connected with one of the elements for moving it into and out of contact with the other element, a bed plate, a carrier for holding and moving the thing to be notched, plate means supported by the bed plate and arranged thereon to be set in any one of a plurality of angular alinements with respect to one of the elements, guide means fixed to the plate means and in contact with the carrier to direct it along a definite path across a portion of one of the elements, operating means for moving the carrier a predetermined distance at each stroke of the moving element, and clamping means for holding the thing to be notched onto the carrier for movement therewith, an index bar fixed to the carrier, dog means connected to the moving die and with the bar for intermittently shifting it predetermined distances at each stroke of the moving die element.

8. In an indenting device for plates, bands, etc., a yoke supporting a male and a female die, means connected with one of the dies for moving it, an angular adjustable plate means supported by the yoke and having a bearing means surrounding one of the dies which acts as a pivot for the plate means, a carrier plate to carry the thing to be indented and which has one edge thereof serrated, means fixed to the plate means for engaging a portion of the carrier plate and guide it in a predetermined line with respect to the dies, said dies comprising a plunger having three flat walls with equal angular cutting edges where they join together and a socket to receive the plunger, a crank arm pivoted near the serrated edge having one end thereof provided with a dog which works on the serrated edge and another end thereof connected with a portion of the male die for movement therewith.

BURR N. ENGLE.